United States Patent [19]

Timberlake et al.

[11] Patent Number: 4,997,857
[45] Date of Patent: Mar. 5, 1991

[54] STABILIZERS FOR POLYMER/POLYOLS

[75] Inventors: John F. Timberlake, Cross Lanes; Siusun K. Leung; Edgar G. Shook, both of S. Charleston; Donald W. Simroth, Charleston; Richard C. Myerly, Canaan Valley, all of W. Va.

[73] Assignee: Arco Chemical Technology, Inc., Wilmington, Del.

[21] Appl. No.: 913,328

[22] Filed: Sep. 30, 1986

[51] Int. Cl.$^5$ .................... C08K 5/00; C08J 9/00; C08G 18/04
[52] U.S. Cl. .................. 521/116; 524/386; 524/387; 524/388; 524/389; 524/345; 524/504; 524/505; 524/560; 524/562; 524/923; 525/93; 525/94; 525/88; 525/242; 525/296; 525/301; 428/323; 428/327; 428/345
[58] Field of Search ............... 524/923, 387, 389, 388, 524/386, 504, 560, 562, 505, 345; 525/296, 301, 242, 88, 93, 94; 428/327, 323, 500; 521/116

[56] References Cited

U.S. PATENT DOCUMENTS

| | | | |
|---|---|---|---|
| 3,652,639 | 3/1972 | Pizzini et al. | 558/358 |
| 3,823,201 | 7/1974 | Pizzini et al. | 524/762 |
| 3,850,861 | 11/1974 | Fabris et al. | 521/170 |
| 3,875,258 | 4/1975 | Patton, Jr. et al. | 528/366 |
| 3,931,092 | 1/1976 | Ramlow et al. | 524/765 |
| 3,950,317 | 4/1976 | Patton, Jr. et al. | 526/78 |
| 3,953,393 | 4/1976 | Ramlow et al. | 525/41 |
| 4,014,846 | 3/1977 | Ramlow et al. | 524/377 |
| 4,093,573 | 6/1978 | Ramlow et al. | 521/137 |
| 4,144,395 | 3/1979 | Murphy et al. | 560/200 |
| 4,148,840 | 4/1979 | Shah | 524/923 |
| 4,357,430 | 11/1982 | VanCleve | 521/128 |
| 4,454,255 | 6/1984 | Ramlow et al. | 521/137 |
| 4,458,038 | 7/1984 | Ramlow et al. | 521/137 |
| 4,521,546 | 6/1985 | O'Connor et al. | 521/137 |
| 4,522,976 | 6/1985 | Grace et al. | 524/722 |
| 4,550,194 | 10/1985 | Reichel et al. | 560/208 |
| 4,568,705 | 2/1986 | Grace et al. | 521/137 |
| 4,639,394 | 1/1987 | Das et al. | 524/923 |

FOREIGN PATENT DOCUMENTS 48-101498 12/1973 Japan .
56-13329 10/1981 Japan .

Primary Examiner—John Kight, III
Assistant Examiner—Dennis R. Daley
Attorney, Agent, or Firm—Paul W. Leuzzi

[57] ABSTRACT

A stabilizer for polymer/polyols characterized by four key features: (1) prepared from a starting polyol having a functionality greater than 4; (2) having at least 60% retained unsaturation; (3) having a viscosity greater than 2000 cSt; and (4) prepared where the starting polyol is capped with alkylene oxide and/or the adduct formed between the starting polyol and the reactive unsaturated compound is capped with ethylene oxide.

26 Claims, No Drawings

STABILIZERS FOR POLYMER/POLYOLS

BACKGROUND OF THE INVENTION

1. Field of the Invention

The present invention relates to stabilizers for polymer/polyols, their preparation, the polymer/polyols so produced employing the stabilizer and polyurethane foams made from such polymer/polyols. More particularly, the instant invention relates to stabilizers having four key features: (1) they are prepared from a starting polyol having a functionality greater than 4, (2) they have at least 60% retained unsaturation, (3) they have viscosities greater than 2000 cSt (25° C.), and (4) they are prepared where the starting polyol is capped with ethylene oxide and/or the adduct formed between the starting polyol and the a reactive unsaturated compound is capped with ethylene oxide.

2. Description of the Prior Art

Polymer/polyol compositions suitable for use in producing polyurethane foams, elastomers and the like are known materials The basic patents in the field are Stamberger Re. 28,715 (reissue of U.S. Pat. No. 3,383,351) and Re. 29,118 (reissue of U.S. Pat. No. 3,304,273). Such compositions can be produced by polymerizing one or more ethylenically unsaturated monomers dissolved or dispersed in a polyol in the presence of a free radical catalyst to form a stable dispersion of polymer particles in the polyol. These polymer/polyol compositions have the valuable property of imparting to polyurethane foams and elastomers produced therefrom higher load bearing properties than are provided by the corresponding unmodified polyols.

The polymer/polyol compositions that found initial commercial acceptance were primarily compositions produced using acrylonitrile. Many of these compositions were somewhat higher in viscosity than desired in some applications. More recently, polymer/polyol compositions produced from acrylonitrile-styrene monomer mixtures have been used commercially.

Polyurethane foams made with polymer/polyols are widely utilized. The two major types of foam are generally termed slabstock and molded. More particularly, slabstock foams employing polymer/polyol compositions are used in the carpet, furniture and bedding industries. One primary use of slabstock foam is as carpet underlay.

In the molded foam area, the primary type of foam employed is generally termed high resiliency (HR) molded foam. HR molded foams have been widely used in the automotive industry for applications ranging from molded seats to energy-absorbing padding and the like.

The wide demand for polymer/polyols has spawned a number of trends that have created the need for additional technology. For example, the general trend is to provide slabstock foams that are virtually scorch-free, i.e., white foam products. Indeed, the desire is to provide techniques capable of producing, without substantial economic penalty, virtually scorch free foams at ever-decreasing densities (viz.—1.5 pounds per cubic foot or less) while maintaining satisfactory load-bearing and other foam properties.

Such scorch-free foams have been obtained by utilizing relatively high styrene contents (e.g. —about 65 to 70 percent styrene) in the acrylonitrile-styrene monomer mixture. The utilization of such high styrene monomer mixtures in the molded foam area is also widespread.

The preparation of polymer/polyols from such high styrene monomer mixtures has created difficulties. More particularly, such difficulties arise due to the state of the art to which polyurethane production has now advanced, such as the degree of the stability of polymer/polyol compositions. Many applications require somewhat rigorous stability characteristics, and such characteristics become more difficult to achieve when high styrene monomer mixtures are employed.

A further trend is the desire to provide foams with ever increasing load bearing characteristics for many applications. This is particularly prevalent in the slabstock area where many formulations require the use of "neat" polymer/polyols, i.e., the polymer/polyol is employed without dilution with conventional polyols. While typically not used neat in the molded foam area, polymer/polyols capable of imparting higher and higher load bearing characteristics to such foams are likewise desired.

Such increased load bearing characteristics are being obtained by increasing the polymer or solids content of the polymer/polyol. Solids contents of 35 to 50 weight percent or even more are accordingly desired. Preparing such high solids content polymer/polyols with the degree of stability often desired becomes substantially more difficult as the solids content is increased.

The trend toward the use of high styrene monomer mixtures and high solids content polymer/polyols has likewise resulted in polymer/polyols sometimes having higher than desired viscosities. The viscosity of a polymer/polyol must, of course, be sufficiently low to allow ease in handling during manufacture. Moreover, the viscosity must allow ready transport, handling and, ultimately, adequate processability in the foam processing equipment being utilized. The viscosity level is becoming of acute concern in the molded area due to the sophisticated mixing systems, such as impingement systems, that are increasingly being utilized. There is a clear need to provide the desired polymer/polyols with as low a viscosity as possible.

Also, the degree of stability of the polymer/polyol, as alluded to previously, is of concern. At one time, there was not much concern for the seediness or filterability of polymer/polyols in actual commercial practice. However, the state of the art of polyurethane production has now advanced to the point where these considerations are very important in many applications. This is particularly important in the molded foam area.

Thus, the development of sophisticated, high-speed and large volume equipment, machines and systems for handling, mixing and reacting polyurethane-forming ingredients has created the need for highly stable and low viscosity polymer/polyols. Polymer/polyols must accordingly meet certain minimum requirements in order to be capable of being satisfactorily processed in the sophisticated foam equipment now used. Typically, the prime requirement is that the polymer/polyols possess sufficiently small particles so that filters, pumps and the like do not become plugged or fouled in relatively short periods of time.

Since the basic development by Stamberger, a substantial amount of effort has been devoted to providing improved polymer/polyols and to improved preparation techniques. For example, U.S. Pat. No. 4,208,314 to Priest et al. discloses low viscosity polymer/polyols made from acrylonitrile styrene monomer mixtures.

These polymer/polyols can be converted to low density, water blown polyurethane foams having reduced scorch, especially when the acrylonitrile-to-styrene ratio is relatively low. The Priest et al. patent also provides a process for making polymer/polyols whereby the particulate nature of the polymer portion of the product is considerably improved, compared to polymer/polyols prepared by prior processes. The improved process provided by Priest et al. includes, in general, maintaining a low monomer to polyol concentration throughout the reaction mixture during the polymerization.

A further improvement in the formation of polymer/polyols is provided by U.S. Pat. No. 4,148,840 to Shah. This discloses a process for producing highly stable and filterable polymer/polyol compositions by polymerizing the monomer or monomers in situ in a polyol mixture that includes a minor amount of preformed polymer/polyol.

It has been recognized that the stability of polymer/polyols requires the presence of a minor amount of a graft or addition copolymer which is formed in situ from growing polymer chains and polyol molecules. Some prior approaches have thus been directed to incorporation of small amounts of unsaturation into the polyol in addition to that inherently present in the polyoxyalkylene polyols typically used in forming polymer/polyols in the belief that improved stability will result due to an increased amount of an addition copolymer stabilizer expected to be formed. U.S. Pat. Nos. 3,652,639, 3,823,201, and 3,850,861, British Patent No. 1,126,025 and Japanese Patent Nos. 52-80919 and 48,101494 all utilize this approach.

In a similar vein, the use of what may be termed "stabilizer precursors" has been proposed. More specifically, the concept is to carry out the preparation of the polymer/polyol in the presence of a suitable amount of the stabilizer precursor, which precursor comprises what has been termed a "macromer" that contains a particular level of reactive unsaturation. The belief is that, during polymerization in the preparation of the polymer/polyol, adequate amounts of stabilizer will be formed by the addition polymerization of the precursor stabilizer with a growing polymer chain. The concept of using stabilizer precursors in polymerization is a well-recognized and old technique as discussed in "Dispersion Polymerization in Organic Media", edited by K. E. J. Barrett, John Wiley & Sons, copyright 1975. U.S. Pat. Nos. 4,454,255 and 4,458,038 are recent examples utilizing this technique. The macromer in the '255 and '038 patents may be obtained by reacting a polyol with a compound having reactive ethylenic unsaturation such as, for example, maleic anhydride or fumaric acid. A further example of the use of this technique is U.S. Pat. No. 4,460,715. The reactive unsaturation in the '715 stabilizer is provided by an acrylate or methacrylate moiety.

More recently, U.S. Pat. No. 4,550,194 disclosed a polyol which is alleged to find utility as a precursor in the preparation of graft polymer dispersions although no specific mention of its use to prepare a stabilizer is made. This polyol is prepared by reacting a conventional polyether polyol with an organic compound having ethylenic unsaturation and an anhydride group forming a half ester and subsequently reacting that product with alkylene oxide in the presence of calcium naphthenate or cobalt naphthenate. In particular, see example 51 of this patent where pentaerythritol is used.

In U.S. Ser. No. 699,970 filed Feb. 11, 1985, stabilizer precursors are taught for polymer/polyols. In particular, Stabilizers A and B utilized polyols with added unsaturation.

OBJECTS OF THE INVENTION

The primary object of the present invention is to provide a new stabilizer which will allow for the production of stable polymer/polyols having high polymer contents with low viscosities.

It is another object of the present invention to provide a stabilizer that can be utilized in low levels in producing stable polymer/polyols.

It is yet another object of this invention to provide stable polymer/polyols with high polymer contents and low viscosities.

Another object of the present invention is to prepare a urethane foam that is characterized as having open cells and whose formulation is stable during its formation so as to avoid foam collapse.

Other objects of this invention will be apparent from the description and examples set forth hereinafter.

SUMMARY OF THE INVENTION

This invention deals with the preparation of a stabilizer precursor, hereinafter referred to for brevity as a "stabilizer", the use of such a stabilizer to make an improved polymer/polyol, and the polyurethane foams subsequently prepared from such polymer/polyols which foams show improved properties.

The key features of the stabilizer are (1) the use of a starting polyol to make the stabilizer having a functionality greater than 4, (2) the presence of at least 60% and preferably greater than 80% of retained unsaturation, (3) a stabilizer viscosity greater than 2000 cSt and preferably greater than 4000 cSt, and (4) ethylene oxide capping of the starting polyols and/or ethylene oxide capping of the adduct formed when the reactive unsaturated compound is added to the starting polyol.

The stabilizers are then employed in making polymer/polyols by conventional techniques.

The polymer/polyols made utilizing the stabilizers are advantageously employed in making polyurethane foams by conventional techniques. These foams exhibit surprising and improved foam properties, i.e., open foams which are more stable during formation.

DETAILED DESCRIPTION OF THE INVENTION

STABILIZERS AND THEIR PREPARATION

Suitable stabilizers are, in general, prepared by the reaction of the selected reactive unsaturated compound with the selected polyol.

By the terminology reactive unsaturated compound, it is meant any compound capable of forming an adduct with a polyol, either directly or indirectly, and having carbon-to-carbon double bonds which are adequately reactive with the particular monomer system being utilized. More specifically, compounds containing alpha, beta unsaturation are preferred. Suitable compounds satisfying this criteria include the maleates, fumarates, acrylates, and methacrylates While not alpha, beta unsaturated compounds, polyol adducts formed from substituted vinyl benzenes such as chloromethylstyrene may likewise be utilized. Illustrative examples of suitable alpha, beta unsaturated compounds which may be employed to form the stabilizer precursor include maleic anhydride, itaconic anhydride, fumaric acid, tetrahydrophthalic anhydride, dialkyl fumarates, dialkyl maleates, glycol maleates, qlycol fumarates, isocyanatoethyl acrylate or methacrylate, methyl acrylate or methacrylate, hydroxyalkyl acrylate or methacrylate, acrylic and methacrylic acid and their anhydride, methacroyl chloride and glycidyl methacrylate. The preferred compound is maleic anhydride.

With respect to the polyol reactant, any polyol used for the base polyol may be employed so long as it has a theoretical functionality greater than four (4). It is preferred to utilize polyoxyalkylene polyols. The molecular weight of the polyol utilized should be relatively high, preferably above about 4000 (number average) and, more preferably, at least about 4500. However, polyols having molecular weights as low as about 3000 may be utilized if desired. Either the polyol reactant or the adduct formed between the polyol reactant and the unsaturated compound must be capped with ethylene oxide.

A variety of starters with functionalities above 4 are well known and may be used. Mixtures may likewise be employed. It is particularly preferred to utilize sorbitol as the polyol. Such polyols are preferably characterized by an hydroxyl number of below about 35.

The level of retained ethylenic unsaturation in the stabilizer must be tightly controlled to at least 60%. It is preferred to prepare the stabilizer in such a fashion that the unsaturation is retained to the maximum extent possible, most preferably above 80%.

Loss of unsaturation may occur in stabilizer preparation with any of the alpha, beta unsaturated compounds. For example, it has been recognized that when maleic anhydride is employed anywhere from about 25 percent to essentially all of the unsaturation may be lost. Loss in unsaturation appears to be generally accompanied by an increase in viscosity of the stabilizer. It is accordingly desirable to utilize an efficient process in the preparation of the stabilizer.

Preferably, the unsaturation is of the fumarate type. It is accordingly preferred to utilize a compound having fumarate-type unsaturation or an unsaturated compound which, under the reaction conditions used in forming the adduct with the polyol, will form a high proportion of fumarate-type unsaturation. Likewise, under appropriate conditions, maleate-type unsaturation can be isomerized to fumarate, as is known, by such compounds as morpholine. The minimum and maximum levels of unsaturation are both constricted by the dispersion stability that the stabilizer is capable of imparting to the polymer/polyol composition.

On the other hand, the maximum level of unsaturation is constricted by crosslinking of the stabilizer which may occur. More particularly, when higher levels of unsaturation are attempted to be added in preparing the stabilizer, there is a greater probability that species will be formed having more than one double bond per molecule, i.e., be something other than a monoadduct. An undue population of such specie may cause crosslinking and thus adversely affect the ability of the stabilizer to provide the requisite dispersion stability enhancement, as well as substantially increasing the viscosity. Accordingly, the maximum level of unsaturation added should be below that at which significant crosslinking occurs, that is, on the average no more than about one carbon-to-carbon double bond per molecule of stabilizer should occur.

It has been found satisfactory to maintain the ratio of the reactive unsaturated compound to polyol in the range of from about 0.5 to perhaps about 1.5 moles of the reactive unsaturated compound per mole of polyol, more preferably 0.7 to about 1.1 mole per mole of polyol.

The specific level of unsaturation utilized will further depend on the molecular weight of the polyol used to prepare the stabilizer and on the viscosity of the stabilizer itself.

When stabilizer preparation involves alkylene oxide capping, the stabilizer preparation is preferably carried out in the presence of a catalytic amount of a strong base. Suitable bases include inorganic bases such as alkali and alkaline earth metal hydroxides and the weak acid salts of alkali and alkaline earth metals, and organic bases such as quaternary ammonium hydroxides, 4-dimethylaminopyridine, 4-pyrrollidinopyridine, and imidazole. Potassium hydroxide has been bound to be useful. The amount of catalyst is not critical; and may, for example, be used over the range of from 10 to 200 ppm when potassium hydroxide is used, preferably, the catalyst range is 30 to 120 ppm.

Suitable reaction temperatures may vary from about 100° to 125° C. or so. The reaction should take from about 2 to 100 hours, although the precise reaction time will depend on a variety of factors such as reaction temperature, specific reactants and desired product. Desirably, the reaction should be carried out in a reactor capable of agitation and pressurization. It is necessary to introduce an alkylene oxide, preferably ethylene oxide, either with the other reactants or subsequently, which is reacted with the adduct until the acid number is below at least about 3.0, preferably below about 1.0, but not so low as to cause a viscosity increase with an accompanying loss of unsaturation while the unreacted alkylene oxide is being stripped off. The catalyst level, the amount of alkylene oxide added, the reaction temperature and reaction time all may be varied within reasonable limits to avoid too low an acid number and the adverse results associated with such a low number, such as viscosity increase and loss of unsaturation. The product may then be cooled and stripped to remove excess alkylene oxide and is then ready for use in preparing polymer/polyols.

Viscosities of greater than 2000 cSt (25° C.) are required of the stabilizer. The maximum viscosity of useful stabilizer will be typically dictated by practical considerations. More specifically, the viscosity of the stabilizer should not be so high that it cannot be conveniently handled. Viscosities up to perhaps 10,000 to 15,000 cSt or so should be capable of being satisfactorily handled. Moreover, by blending with base polyol in the reactor used to form the stabilizer, even substantially higher viscosities (e.g., up to 25,000 to 40,000 cSt or higher) should be suitable.

The viscosity can then be increased above 2000 cSt by one of two means. The first method is to continue to react (cookout) the stabilizer preparation under the controlled conditions until the desired viscosity is achieved. By this method at least 60% or greater of the added unsaturation is retained depending to some extent on how high the viscosity is raised. The unsaturation can be converted to fumarate unsaturation during or after the cookout by adding an isomerization catalyst, such as morpholine, with no significant loss of unsaturation.

A second method to raise the viscosity, which is preferred because a higher level of added unsaturation can be maintained (60 to 100%) at high viscosities, is to couple the stabilizer with a chemically reactive compound such as polyisocyanate (preferably MDI), dimethyl oxalate, succinoyl chloride and the like to the desired viscosity. Generally, no unsaturation is lost during the reaction of polyisocyanate with the stabilizer.

BASE POLYOL

The polyol or blends thereof, employed as the base polyol depends upon the end use of the polyurethane product to be produced. The molecular weight or hydroxyl number of the base polyol may thus be selected so as to result in flexible, semi flexible, or rigid foams or elastomers when the polymer/polyol produced from the base polyol is converted to a polyurethane. The hydroxyl number of the polyol or polyols employed can accordingly vary over a wide range. In general, the hydroxyl number of the polyols employed may range from about 20 (or lower) to about 150 (and higher).

For example, when foams are to be prepared, the molecular weight or the hydroxyl number may be selected to result in flexible, semi-flexible, or rigid foams. The polyols in this instance preferably possess a hydroxyl number of at least 150 for rigid foams, from about 50 to about 150 for semi-flexible foams, and from about 20 to about 70 for flexible foams. As a further refinement, the specific foam application will likewise influence the choice of base polyol. As an example, for molded foam, the hydroxyl number of the base polyol may be on the order of about 20 to about 40, and for slabstock the hydroxyl number may be on the order of about 25 to about 70.

As a further example, for elastomer applications, it will qenerally be desirable to utilize relatively high molecular weight base polyols having relatively low hydroxyl numbers, e.g., 20 to 50 or so.

The hydroxyl number limits described above are not intended to be restrictive, but are merely illustrative of the large number of possible combinations for the polyol or polyols used.

The hydroxyl number is defined as the number of milligrams of potassium hydroxide required for the complete hydrolysis of the fully phthalated derivative prepared from one gram of polyol. The hydroxyl number can also be defined by the equation:

$$OH = (56.1 \times 1000 \times f)/m.w.$$

where
 OH = hydroxyl number of the polyol
 f = functionality, that is, average number of hydroxyl groups per molecule of polyol
 m.w. = number average molecular weight of the polyol.

Substantially any of the polyols previously used in the art to make polymer/polyols can be used as the base polyol in this invention. Illustrative of the polyols useful in producing polymer/polyol compositions in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:

(a) alkylene oxide adducts of polyhydroxyalkanes;

(b) alkylene oxide adducts of nonreducing sugars and sugar derivatives;

(c) alkylene oxide adducts of phosphorus and polyphosphorus acids;

(d) alkylene oxide adducts of polyphenols;

(e) the polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6 dihydroxyhexane, 1,2-, 1,3-, 1,4-, 1, 6-, and 1,8-dihydroxyoctane, 1,10-dihydroxydecane, glycerol, 1,2,4-trihydroxylbutane, 1,2,6-trihydroxlyhexane, 1,1,1-trimethylolethane, 1,1,1-trimethylolpropane, pentaerythritol, oaprolactone, polycaprolactone, xylitol, arabitol, sorbitol, mannitol, and the like.

A further class of polyols which can be employed are the alkylene oxide adducts of the nonreducing sugars, wherein the alkylene oxides have from 2 to 4 carbon atoms. Among the nonreducing sugars and sugar derivatives contemplated are sucrose, alkyl glycosides such as methyl glucoside, ethyl qlucoside, and the like, glycol glycosides such as ethylene glycol glucoside, propylene glycol glycoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation productions of phenol and formaldehyde, and novolac resins; condensation products of various phenolic compounds and acrolein; the simplest member of this class being 1,2,3-tris(hydroxyphenyl) propanes, condensation products of various phenolic compounds and glyoxal, qlutaraldehyde, and other dialdehydes, the simplest members of this class being the 1,1,2,2-tetrakis (hydroxyphenol) ethanes, and the like.

The alkylene oxide adducts of phosphorus and polyphosphorus acids are another useful class of polyols. Ethylene oxide, 1,2-epoxypropane, the epoxybutanes, 3-chloro 1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

Indeed, any material having an active hydrogen as determined by the Zerewitinoff test may be utilized as the base polyol. For example, amine-terminated polyether polyols are known and may be utilized, if desired.

The most preferred base polyols employed in this invention include the poly(oxypropylene) glycols, triols, and higher functionality polyols, and the like that are capped with ethylene or propylene oxide as dictated by the reactivity requirements of the particular polyurethane application. Generally, the nominal functionality of such polyols will be in the range of about 3 to 4 or so. These polyols also include poly(oxypropylene oxyethylene) polyols; however, desirably, the oxyethylene content should comprise less than 80 percent of the total and preferably less than 60 percent. The ethylene oxide, when used, can be incorporated in any fashion along the polymer chain. Stated another way, the ethylene oxide can be incorporated either in internal blocks, as terminal blocks, or may be randomly distributed along the polyol chain.

As is well known in the art, the polyols that are most preferred herein contain varying small amounts of unsaturation. Unsaturation in itself does not affect in any adverse way the formation of the polymer/polyols in accordance with the present invention except in the case where the extent or type of unsaturation is so high as to result in a highly crosslinked polymer/polyol or gel.

MONOMERS USED

Conceptually, a wide variety of monomers may be utilized in the preparation of the polymer/polyol compositions in accordance with the invention. Numerous ethylenically unsaturated monomers are disclosed in the prior patents. Any of these monomers should be suitable.

The selection of the monomer or monomers used will depend on considerations such as the relative cost of the monomers and the polyurethane product characteristics required for the intended application. To impart the desired load bearing to the foams, the monomer or monomers used in preparing the polymer/polyol should, of course, desirably be selected to provide a polymer which has a glass transition of at least slightly higher than room temperature. Exemplary monomers include styrene and its derivatives such as para-methylstyrene, acrylates, methacrylates such as methyl methacrylate, acrylonitrile and other nitrile derivatives such as methacrylonitrile, and the like. Vinylidene chloride may also be employed.

The preferred monomer mixtures used to make the polymer/polyol compositions of this invention are mixtures of acrylonitrile and styrene or acrylonitrile, styrene and vinylidene chloride.

As the amount of styrene or its derivatives in the monomer mixture is increased above about 70 weight percent or so, it becomes increasingly more difficult to make satisfactorily stable polymer/polyols. Additionally, at such high styrene levels, problems other than stability are also typically encountered. These problems include a decrease in conversion of the styrene monomer and the concomitant need to adequately strip the styrene monomer, as well as an increase in the viscosity of the polymer/polyol. Despite these drawbacks, levels of styrene greater than 75 weight percent and even as high as 100 weight percent may be desirable.

The monomer content will be typically selected to provide the desired solids content required for the anticipated end use application. In general, it will usually be desirable to form the polymer/polyols with as high a resulting polymer or solids content as will provide the desired viscosity and stability properties. The present invention is highly desirable for preparing polymer/polyols having solids contents in excess of 25 or 30 percent by weight, based upon the weight of the polymer/polyol composition.

For molded foam applications, typically high resiliency formulations, solids content of up to about 45 weight percent or more are feasible and may be provided utilizing the present invention. In slabstock applications, the tendency is to utilize as high a solids content as possible, contents of 45 weight percent to about 50 weight percent or more being desired commercially for some applications.

POLYMER/POLYOL PREPARATION

The polymer/polyols of this invention are produced by polymerizing the monomer system used in the presence of a free radical catalyst in the base polyol and a stabilizer.

The stabilizer, as previously described, should be added to the base polyol in an amount sufficient to provide the desired stability assistance for the resulting polymer/polyol. It will generally be suitable to incorporate a stabilizer in amounts up to perhaps about 30 percent or so, based upon the weight of the polyol. Levels from about 1 percent to about 20 percent by weight o so should generally be suitable for polymer/polyols. If desired, a mixture of stabilizers can, of course, be used.

The polymer/polyols of the present invention are preferably prepared utilizing the process set forth in the previously identified Priest et al. patent. In accordance with that process, a low monomer-to polyol ratio is maintained throughout the reaction mixture during the polymerization process. Such low ratios are achieved by employing process condition that provide rapid conversion of monomer to polymer. In practice, a low monomer to polyol ratio is maintained, in the case of semi-batch and continuous operation, by use of a free radical polymerization catalyst, by control of the temperature and mixing conditions and, in the case of semi-batch operation, by slowly adding the monomers to the polyol.

The mixing conditions employed are those attained using a back mixed reactor (e.g., a stirred flask or stirred autoclave). Reactors of this type keep the reaction mixture relatively uniform and so prevent localized high monomer to polyol ratios. However, tubular reactors may be employed if they are modified so that increments of the monomer are added to various stages.

The utilization of the Priest et al. process is preferred since this allows the preparation of polymer/polyols with a wide range of monomer composition, polymer contents, and base polyol that could not be otherwise prepared with the necessary stability now often desired. However, whether the utilization of the Priest et al. process is essential depends upon whether the process parameters are such that a satisfactory polymer/polyol can be prepared without using this process.

Other processing technology is disclosed in the prior art and may likewise be used in the preparation of the polymer/polyols of the present invention. For example, the techniques set forth in U.S. Pat. No. 4,119,586 to Shah may be employed, if desired.

Control of residence time has been found useful in controlling both the degree of crosslinking (XLC) and the intrinsic viscosity of the polymer which, as mentioned in U.S. Pat. Ser. No. 699,970 filed Feb. 11, 1985, may be advantageous. In a continuous operation, a stable dispersion of a polymer in a polyol is produced where the residence time, which is defined as that time calculated by dividing the reactor's volume by the volumetric flow rate of the total feed to the reactor, is from about 1 minute to about 5 hours, and preferably, from about 10 minutes to about 2 hours.

In a semi batch operation where the reactor can be partially charged prior to initiating polymerization, the term residence time refers to that period of time during which significant polymerization of the monomer or co-monomers occurs. In semi batch operation, residence times from about 30 minutes to about 10 hours are recommended.

Catalysts useful in producing the polymer/polyol compositions of this invention are the free radical-type, vinyl polymerization catalysts such as the peroxides, percarbonates, and the azo compounds. Any other suitable catalyst may be employed. Azo catalysts such as azobis (isobutyronitrile) are the preferred catalysts. 2,2'-azobis (isobutyronitrile) is particularly preferred because it does not increase the acid number of the product, does not impart objectionable odor to the product, and does not require special handling, particularly as compared to certain peroxide catalysts.

The catalyst concentration can be varied within reasonably wide limits. The catalyst concentration will accordingly typically be adjusted to optimize the polymer/polyol properties. Accordingly, the concentration will generally be in the range of about 0.1 to about 3 weight percent based on the total feed to the reactor. The preferred amount of catalyst will be in the range of about 0.2 weight percent to about 1.0 weight percent. Up to a certain point, increases in the catalyst concentration result in increased monomer conversion but further increases do not substantially increase conversion. Conversions of monomers to polymers which can be typically achieved are on the order of 75% to 98% of the monomer charged. On the other hand, increasing catalyst concentration increasingly improves product stability. The catalyst concentration selected will usually be an optimum value considering all factors, including costs.

The temperature used in producing polymer/polyol compositions in accordance with the invention is not in itself critical and can be any temperature at which the selected catalyst has a reasonable rate of decomposition under the reaction conditions. Typically, in continuous processes, reaction temperatures of from about 100° C. to about 150° C. may be used, the preferred range being from about 100° C. to about 125° C. It has been found that with higher reaction temperatures there is a tendency for the intrinsic viscosity of the polymer to decrease. Accordingly, lower temperatures are preferred, typically in the range from about 105° C. to about 125° C.

Further, the addition of a polymer control agent during the polymerization reaction has been found to be useful. In general, as used herein, the terminology polymer control agent connotes a low molecular weight liquid which, upon use in preparing the polymer/polyol, results in polymer structure such that the polymer has low crosslinking coefficient and controlled intrinsic viscosity. Virtually any low molecular weight liquid should be suitable. A variety of low molecular weight carbon-hydrogen compounds are known and may be employed. The suitability of a particular liquid may be readily determined simply by employing the liquid in the polymer/polyol preparation. Accordingly, low molecular weight liquids may be employed regardless of whether any significant chain transfer activity is exhibited.

Low molecular weight liquids not conventionally viewed as chain transfer agents but useful as polymer control agents include water, cyclohexane, and benzene. Suitable polymer control agents which are conventionally viewed as chain transfer agents include ketones, alcohols, aldehydes, halogenated compounds, benzene derivatives and the like.

Any such known chain transfer agents can be utilized as the polymer control agents, if desired.

The polymer control agent or agents used should be added in an amount that will provide a polymer having the desired properties. Suitable levels will, of course, vary as discussed herein. Amounts up to 20 weight percent or higher, based on the total feed to the reactor, may be used satisfactorily. More typically, useful levels will be about 2 to 10 percent or so.

The viscosity of the polymer/polyol compositions can vary over a wide range, depending upon the limitations and requirements of the particular end use application. As a practical matter, it is generally desired to minimize the viscosity for obvious reasons. When the viscosity gets too high, it becomes difficult to handle the polymer/polyol, particularly in off-loading, mixing, and the like. In general, it is desired that the viscosity of the resulting polymer/polyol be less than about 10,000 cps at 25° C.

The viscosity of the resulting polymer/polyols will also typically vary depending upon the intended polyurethane application. In high resiliency molded foam applications where solids contents on the order of 25 to 45 weight percent or so are often used (typically diluted with conventional polyols in commercial formulations), the viscosities of the thus-diluted polymer/polyols will typically be in the 3500 to 5000 cps (25° C.) range or higher. In slabstock applications where solids contents of 35 to 60 percent by weight or more are desired and the polymer/polyols are sometimesuused neat, the viscosity will typically be above about 3500 cps (25° C.) or so, often ranging up to 8000 cps (25° C.) or so.

POLYMER/POLYOL STABILITY

From the functional standpoint, suitable polymer/polyols must be capable of being: (1) made, (2) stored, (3) shipped, and (4) used without undue loss of polymer content or damage or fouling of the equipment in which it is made and handled. If a polymer/polyol meets these functional criteria, it is generally considered to be satisfactorily stable.

An indication of the stability can be provided by the filtration performance, which will be more fully discussed in conjunction with the working Examples. The filtration characteristics are determined by passing a sample of the polymer/polyol by gravity, through a 700-mesh wire screen. The most stable polymer/polyols will pass completely through the screen (i.e., over 99 weight percent).

POLYURETHANE PREPARATION

The present invention also provides a method for producing polyurethane products which include reacting: (a) a polymer/polyol composition of this invention, and (b) an organic polyisocyanate in the presence of (c) a catalyst for the reaction of (a) and (b) to produce the polyurethane product. When a foam is being prepared, the reaction is carried out in the presence of a blowing agent and a foam stabilizer. The reaction and foaming operations can be performed in any suitable manner, preferably by the one-shot technique.

The polymer/polyol may, if desired, be blended with conventional polyols or the like to reduce the polymer content to the level required for the particular end use application. Blends in which the resulting polymer content is as low as 4 percent of the total weight of the blend, or even less, are useful.

The organic polyisocyanates that are useful in producing polyurethane products in accordance with this invention are organic compounds that contain at least two isocyanato groups. Such compounds are well known in the art. Suitable organic polyisocyanates include the hydrocarbon diisocyanates (e.q., the alkylene diisocyanates and the arylene diisocyanates), as well as known triisocyanates and polymethylene poly (phenylene isocyanates). Examples of suitable polyisocyanates are 2,4 diisocyanatotoluene, 2,6-diisocyanatotoluene, methylene bis(4-cyclohexyl isocyanate), 1,2 diisocyanatoethane, 1,3-diisocyanatopropane, 1,2 diisocyanatopropane, 1,4-diisocyanatobutane, 1,5 diisocyanatopentane, 1,6-diisocyanatohyxane, bis(3-isocyanatopropyl)ether, bis(3-isocyanatopropyl) sulfide, 1,7-diisocyanatoheptane, 1,5-diisocyanato-2,2-dimethylpentane, 1,6-diisocyanato3-methoxyhexane, 1,8-diisocyanatooctane, 1,5-diisocyanato-2,2,4-trimethylpentane, 1,9-diisocyanatononane, 1,10-diisocyanatopropvl)ether of 1,4-butylene glycol, 1,11-diisocyanatoundecane, 1,12-diisocyanatododecane bis-(isocyanatohexyl) sulfide, 1,4-diisocyanatobenzene, 3,5-diisocyanato oxylene, 4,6-diisocyanato-m-xylene, 2,6-diisocyanato-p-xylene, 2,4-diisocyanato-1-chlorobenzene, 2,4-diisocyanato-1-nitrobenzene, 2,5-diisocyanato-1-nitrobenzene, 4,4-diphenylmethylene diisocyanate, 3,3-diphenyl methylene diisocyanate, and polymethylene poly (phenyleneisocyanates), and mixtures thereof. The preferred polyisocyanate is about 80% of a mixture of 80% 2,4-tolylene diisocyanate and 20%, 2,6-tolylene diisocyanate and about 20% of a polymeric isocyanate.

Any known catalysts useful in producing polyurethanes may be employed. Representative catalysts include: (a) tertiary amines such as bis(2,2'-dimethylamino)ethyl ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as Ti-$(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2(N,N dialkylamino)alkanols, such as the well known chelates of titanium obtained by said or equivalent procedures; (g) salts of organic acids with a variety of metals such as alkali metals, alkaline earth metals, Al, Sn, Pb, Mn, Co, Bi, and Cu, including, for example, sodium acetate, potassium laureate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb and Bi, and metal carbonyls of iron and cobalt.

Among the organotin compounds that deserve particular mention are dialkyltin salts of carboxylic acids, e.g., dibutyltin diacetate, dibutyltin dilaureate, dibutyltin maleate, dilauryltin diacetate, dioctyltin diacetate, dibutyltin-bis(4-methylaminobenzoate), dibutyin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin bis(isopropoxide) dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

When the product to be formed is a polyurethane foam, a small amount of a blowing agent is employed in the reaction mixture. Suitable blowing agents, for example, include water from bout 0.5 to about 5 weight percent, based upon total weight of the polymer/polyol composition, or other suitable blowing agents which are vaporized by the exotherm of the reaction, or a combination of water and the other blowing agent. Illustrative polyurethane blowing agents include halogenated hydrocarbons such as trichloromonofluoromethane, dichlorodifluoromythane, dichloromonofluoromethane, dichloromethane, trichloromethane, 1,1-dichloro-1-fluoroethane, 1,1,2-trichloro 1,2,2-trifluoroethane, hexafluorocyclobutane, octafluorocyclobutane, and the like. Another class of blowing agents include thermally unstable compounds which liberate gases upon heating such as N,N'-dimethyl-N,N'-dinitrosoterephthalamide, amine formates, and the like. The generally preferred method of foaming for producing flexible foams is the use of water, or a combination of water plus a fluorocarbon blowing agent such as trichloromonofluoromethane. The quantity of blowing agent employed will vary with factors such as the density desired in the foamed product.

The scorch free properties of the foams produced using polymer/polyol compositions are most evident when at least some of the blowing agent is water, and the water is used in an amount that results in a foam having a density less than 3.0 pounds per cubic foot. Generally, the use of water in an amount of about 2.0 percent by weight, based on the total weight of the polymer/polyol composition, results in a foam having a density of less than 3.0 pounds per cubic foot.

It is also within the scope of the invention to employ, when applicable, small amounts, e.g., about 0.001 percent to 5.0 percent by weight, based on the total reaction mixture, of a foam stabilizer. Suitable foam stabilizers or surfactants are known and may vary depending upon the particular polyurethane application. Suitable stabilizers for slabstock applications include "hydrolyzable" poysiloxane polyoxyalkylene block copolymers such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. Nos. 3,505,377 and 3,686,254 and British Patent Specification 1,220,471. The latter class of copolymers differs from the above-mentioned polysiloxane polyoxylakylene block copolymers in that the polysiloxane moiety is bonded to the polyoxy-alkylene moiety through direct carbon-to-silicon bonds, rather than through carbon-to-oxygen to silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl-polysiloxanes described in U.S. Pat. No. 3,905,924.

The polyurethanes so produced may be utilized in foam and elastomer applications where any conventional type of polyurethane is or can be utilized. The polymer/polyol compositions of this invention find particular utility in the production of high resiliency foams for use in arm rests, mattresses, automobile seats, and the like, as well as in slabstock foams for use as carpet underlayment, and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

DEFINITIONS

As used in the Examples, the following designations, symbols, terms and abbreviation have the following meanings:

Polyol A—A polyol made by reacting propylene oxide and ethylene oxide successively with glycerol in the presence of potassium hydroxide catalyst and refining to remove catalyst. The polyol contains about 16.5 weight percent ethylene oxide as a cap and has a hydroxyl number of about 28.

Polyol B—A polyol made by reacting propylene oxide and ethylene oxide with sorbitol in the presence of potassium hydroxide catalyst and refining to remove catalyst. The polyol contains about 10 weight percent ethylene oxide as an internal block and has a hydroxyl number of about 28.

Polyol C—A polyol made by reacting propylene oxide and ethylene oxide with sorbitol in the presence of potassium hydroxide catalyst and refining to remove catalyst. The polyol contains about 10 weight percent ethylene oxide as a cap and has a hydroxyl number of about 28.

Polyol D—A polyol made by reacting propylene oxide and ethylene oxide with glycerol in the presence of potassium hydroxide catalyst and refining to remove catalyst. The polyol contains about 10 weight percent ethylene oxide as an internal block and has a hydroxyl number of about 52.

Polyol E—A polyol made by reacting propylene oxide and ethylene oxide with pentaerythritol in the presence of potassium hydroxide catalyst and refining to remove catalyst. The polyol contains about 15 weight percent ethylene oxide as a cap and has a hydroxyl number of about 28.

Polyol F—Same as Polyol E except that about half the hydroxyl groups were tipped with propylene oxide to reduce the primary hydroxyl content.

Polyol G—A polyol made by reacting propylene oxide and ethylene oxide successively with glycerol in the presence of potassium hydroxide catalyst and refining to remove catalyst. The polyol contains about 15 weight percent ethylene oxide as a cap and has a hydroxyl number of about 35.

Polyol H—A polyol made by reacting propylene oxide and ethylene oxide with sorbitol in the presence of potassium hydroxide catalyst and refining to remove catalyst. The polyol contains about 6 weight percent ethylene oxide as a cap and has a hydroxyl number of about 30.

Polyol I—A polyol made by reacting propylene oxide and ethylene oxide with sorbitol in the presence of potassium hydroxide catalyst and refining to remove catalyst. The polyol contains about 3 weight percent ethylene oxide as a cap and has a hydroxyl number of about 32.

Polyol J—A polyol made by reacting propylene oxide and ethylene oxide with sorbitol in the presence of potassium hydroxide catalyst and refining to remove catalyst. The polyol contains about 1.5 weight percent ethylene oxide as a cap and has a hydroxyl number of about 31.

Polyol K—A polyol made by reacting propylene oxide and ethylene oxide with glycerol in the presence of potassium hydroxide catalyst and refining to remove catalyst. The polyol contains about 16.5 weight percent ethylene oxide as a cap and has a hydroxyl number of about 35.

Catalyst A—A polyurethane foam amine catalyst sold as "NIAX Catalyst A 107" by Union Carbide Corporation.

Catalyst B—A mixture of 33 wt. percent 1,4 diazabicyclo[2.2.2.]octane and 67 wt. percent dipropylene glycol.

Catalyst C—A polyurethane foam amine catalyst sold as "NIAX Catalyst C 229" by Union Carbide Corporation.

Catalyst D—A polyurethane tin catalyst sold as "M&T 120" by M&T Chemical Co.

Catalyst E—A polyurethane foam amine catalyst sold as "NIAX Catalyst A 1" by Union Carbide Corporation.

Catalyst F—A polyurethane foam amine catalyst sold as "NIAX Catalyst A 33" by Union Carbide Corporation.

Surfactant A—A silicone surfactant sold for use in high resiliency foam by Union Carbide Corporation as "Silicone Surfactant Y-10366".

AIBN—Azo bis(isobutyronitrile).

Isocyanate A—Modified liquid form of 4,4'-diphenylmethane diisocyanate (MDI) having an equivalent weight of 143 sold as "Isonate 143L" by the Dow Chemical Company.

TDI A mixture of 80 weight percent 2,4-diisocyanatotoluene and 20 weight percent 2,6-diisocyanatotoluene.

Density Density in pounds per cubic foot (ASTM D-3574, Test A).

Resiliency—Resiliency in percent (ASTM D-3574, Test E).

Porosity—Porosity in CFM (ASTM D 3574, Test G).

IFD, 25% —Indentation Force Deflection, 25% (ASTM D-3574, Test B1 and Test B2).

IFD, 65% —Indentation Force Deflection, 65% (ASTM D-3574, Test B1 and Test B2).

IFD, 65/25 —Indentation Force Deflection, 65% divided by Indentation Force Deflection, 25% (ASTM D-3574, Test B1 and Test B2).

CFD, 50%—Compression Force Deflection, 50%(ASTM D-3574, Test C).

Tensile Tensile in psi (ASTM D-3574, Test E).

Elongation—Elongation in percent (ASTM D-3574, Test E).

Tear—Tear Resistance in pounds per inch (ASTM D-3574, Test F).

Comp. Set, 75% Compression Set, 75% (ASTM D-3574, Test D).

HA Load Loss, 50% —Humid Age Load Loss, 50% (ASTM D-3574, Test D).

HA Comp. Set, 50% —Humid Age Compression Set, 50% (ASTM D-3574, Test D).

Viscosity viscosities were measured either by Brookfield viscometer (cps) or Cannon Fenske viscometer (cSt).

FILTRATION HINDRANCE (FILTERABILITY)—

Filterability is determined by diluting one part by weight sample (e.g., 200 grams) of polymer/polyol with two parts by weight anhydrous isopropanol (e.g., 400 grams) to remove any viscosity imposed limitations and using a fixed quantity of material in relation to a fixed cross-sectional area of screen (e.g., 1-⅛in. diameter), such that all of the polymer/ polyol and isopropanol solution passes by gravity through a 150 mesh or 700-mesh screen. The 150-mesh screen has a square mesh with average mesh opening of 105 microns, and it is a "Standard Tyler" 150 square-mesh screen. The 700 mesh screen is made with a Dutch twill weave. The actual screen used had a nominal opening of 30 microns. The amount of sample which passes through the screen is reported in percent, a value of 100 percent indicates that over 99 weight percent passes through the screen.

PREPARATION

A. STABILIZER PREPARATION

The following general procedure was followed for Examples 1 to 16 and Comparative Examples A to D. The polyol and the specified concentration of OH (added as 50% aqueous) were charged to a stainless steel stirred reactor and the reactor purged with nitrogen. The mixture was heated at 80° C. followed by the addition of the maleic anhydride solid. The contents were heated to the desired temperature and either ethylene oxide or propylene oxide was added by pumping. After the prescribed reaction time, the excess oxide was removed by stripping under vacuum. The results are summarized in Table I. The acid number reported was the final acid number after the product was stripped (in mg KOH per gram of sample).

The examples in Table I show the effect of process conditions on product viscosity and amount of retained unsaturation. Note the higher levels of retained unsaturation for 110° C. when the acid number is higher and the viscosity is 2000 or so. Catalyst concentration, EO content, and reaction time also affect the product.

B. STABILIZER COUPLING

The following general procedure was used in Examples 17 to 25 for the reaction of Isocyanate A with the stabilizer formed in Example 7. The sample from Example 7 was placed in a four-neck round bottom flask and heated to 80° C. The indicated amount of Isocyanate A was added slowly (about one to two minute addition time). The mixture was maintained at 80° C. for one hour after the addition was complete. Infrared analysis of the resultant product showed no residual isocyanate groups. The results of these experiments are summarized in Table II.

In Example 26, a portion (4000 g) of the stabilizer from Example 8 was placed in a four neck round bottom flask and heated to 80° C. Isocyanate A (28 g) was added and the mixture maintained at 80° C. for one hour. The resultant product had a viscosity of 5575 cps.

POLYMER/POLYOLS

All polymer/polyols of Examples 27–34 and E-H were prepared using a single stage 550 ml backmixed continuous reactor with a 12 minute residence time. The reactor was maintained at 120° C. and about 45 psig pressure durinq the startup, lineout, and product collections stages. The feeds for each of Examples 27 through 34 and comparative Examples E through H are given in Table III. The properties of the resultant polymer/polyols are also given.

Example 27 shows the improved polymer/polyol stability with a higher viscosity stabilizer precursor when compared to Example 28. Example 33 demonstrates the use of an Isocyanate A coupled precursor where the retained unsaturation was 87 percent, the filterability was 100 percent through 700 mesh, and the viscosity was at a low value of 3825 cps.

D. FOAM PROPERTIES

Examples 35 through 39 and comparative examples I and J consist of molded foams prepared from example polymer polyols using the formulations in Table IV. The force to crush and vent collapse data are also given.

Examples 40 through 46 consist of molded foams prepared from example polymer polyols using the formulations in Table V. The physical properties of these foams are also summarized.

All the above foams were made using TDI at an index of 100.

TABLE I

| Example Number | Polyol | Maleic Anhydride Weight % | Maleic Anhydride meq/g | KOH ppm | Oxide ID | Moles oxide per mole MA | Reaction Temp, deg C. | Reaction Time, hours | Acid No. | Isomerized with morpholine | Unsaturation, mequiv./g-polyol | Viscosity, cps, 25 C. | Retained Unsaturation (%) |
|---|---|---|---|---|---|---|---|---|---|---|---|---|---|
| 1 | C | 1.0% | 0.102 | 60 | EO | 5.3 | 110 | 21 | 0.51 | Yes | 0.100 F | 2040 | 98% |
| 2 | C | 1.1% | 0.112 | 25 | EO | 6.0 | 125 | 23 | 0.06 | Yes* | 0.053 F/ 0.025 M | 4262 | 70% |
| 3 | C | 1.0% | 0.102 | 18 | EO | 6.0 | 125 | 23 | 0.28 | Yes | 0.075 F | 5003 | 74% |
| 4 | C | 1.1% | 0.112 | 60 | EO | 3.0 | 110 | 24 | 0.00 | Yes | 0.088 F | 6001 | 79% |
| 5 | C | 1.1% | 0.112 | 60 | EO | 5.3 | 110 | 24 | 0.01 | No | 0.080 M | 7200 | 71% |
| 6 | C | 1.0% | 0.102 | 60 | EO | 5.3 | 110 | 43 | 0.00 | No | 0.078 M | 7923 | 76% |

TABLE I-continued

| Example Number | Polyol | Maleic Anhydride Weight % | Maleic Anhydride meq/g | KOH ppm | Oxide ID | Moles oxide per mole MA | Reaction Temp, deg C. | Reaction Time, hours | Acid No. | Isomerized with morpholine | Unsaturation, mequiv./g-polyol | Viscosity, cps, 25 C. | Retained Unsaturation (%) |
|---|---|---|---|---|---|---|---|---|---|---|---|---|---|
| 7 | C | 1.1% | 0.112 | 60 | EO | 3.0 | 110 | 18 | 0.08 | No | 0.094 | 2225 | 84% |
| 8 | C | 1.1% | 0.112 | 60 | EO | 5.3 | 110 | 8 | 0.26 | Yes | 0.092 F | 2405 | 82% |
| 9 | C | 1.1% | 0.112 | 60 | EO | 5.0 | 110 | 24 | 0.00 | Yes | 0.082 F | 6718 | 73% |
| 10 | C | 1.0% | 0.102 | 30 | EO | 7.1 | 125 | 23 | 0.09 | Yes | 0.077 F | 7100 | 75% |
| 11 | C | 1.1% | 0.112 | 120 | EO | 1.6 | 110 | 27 | 0.00 | No | 0.089 M | 2610 | 79% |
| 12 | H | 1.0% | 0.102 | 33 | EO | 7.1 | 125 | 24 | 0.08 | Yes | 0.074 F | 5050 | 73% |
| 13 | I | 1.0% | 0.102 | 33 | EO | 7.5 | 125 | 18 | 0.07 | Yes | 0.074 F | 2650 | 73% |
| 14 | J | 1.0% | 0.102 | 33 | EO | 13.0 | 125 | 20 | 0.06 | Yes | 0.091 F | 2040 | 89% |
| 15 | B | 1.0% | 0.102 | 33 | EO | 10.1 | 125 | 22 | 0.11 | Yes | 0.079 F | 3044 | 77% |
| 16 | C | 1.0% | 0.102 | 22 | EO | 7.1 | 125 | 20 | 0.06 | Yes | 0.076 F | 2019 | 75% |
| 16-1 | C | 1.1% | 0.112 | 60 | EO | 2.0 | 110 | 39 | 0.41 | Yes | 0.09 F | 2504 | 80% |
| A | E | 1.2% | 0.122 | 33 | PO | 8.3 | 125 | 21 | 0.05 | Yes | 0.084 F | 4020 | 69% |
| B | F | 1.2% | 0.122 | 33 | PO | 8.4 | 125 | 19 | 0.20 | Yes | 0.106 F | 1745 | 87% |
| C | G | 2.0% | 0.204 | 20 | EO | 5.2 | 175 | 20 | 0.08 | No | 0.097 F | 4063 | 48% |
| D | B | 1.0% | 0.102 | 30 | PO | 6.0 | 125 | 18 | 0.04 | Yes | 0.061 F | 3100 | 60% |

*Partially isomerized.
F = fumarate
M = maleate

TABLE II

| EXAMPLE NUMBER | WT % ISOCYANATE A | VISCOSITY cSt or cps at 25° C. |
|---|---|---|
| 17 | 0.20 | 2873 |
| 18 | 0.36 | 3220 |
| 19 | 0.40 | 3553 |
| 20 | 0.50 | 4202 |
| 21 | 0.60 | 4553 |
| 22 | 0.72 | 5500 |
| 23 | 0.80 | 6601 |
| 24 | 1.00 | 7509 |
| 25 | 1.43 | 44500 |

TABLE III

| | Ex. 27 | Ex. 28 | Ex. 29 | Ex. 30 | Ex. 31 | Ex. 32 | Ex. 33 | Ex. 34 | Ex. E | Ex. F | Ex. G | Ex. H |
|---|---|---|---|---|---|---|---|---|---|---|---|---|
| FEEDS (weight percent) | | | | | | | | | | | | |
| Base Polyol Type | A | A | A | A | A | A | A | A | A | A | A | A |
| Stabilizer Type (from Example No.) | 10 | 16 | 12 | 13 | 14 | 15 | 26 | 25 | A | B | C | D |
| Base Polyol % | 62.9% | 62.9% | 62.9% | 62.9% | 62.9% | 62.9% | 62.9% | 65.6% | 60.9% | 60.9% | 62.9% | 62.9% |
| Stabilizer % | 4.0% | 4.0% | 4.0% | 4.0% | 4.0% | 4.0% | 4.0% | 1.3% | 6.0% | 6.0% | 4.0% | 4.0% |
| Isopropanol % | 3.0% | 3.0% | 3.0% | 3.0% | 3.0% | 3.0% | 3.0% | 3.0% | 3.0% | 3.0% | 3.0% | 3.0% |
| AIBN % | 0.6% | 0.6% | 0.6% | 0.6% | 0.6% | 0.6% | 0.6% | 0.6% | 0.6% | 0.6% | 0.6% | 0.6% |
| Styrene % | 20.6% | 20.6% | 20.6% | 20.6% | 20.6% | 20.6% | 20.6% | 20.6% | 20.6% | 20.6% | 20.6% | 20.6% |
| Acrylonitrile % | 8.8% | 8.8% | 8.8% | 8.8% | 8.8% | 8.8% | 8.8% | 8.8% | 8.8% | 8.8% | 8.8% | 8.8% |
| PROPERTIES | | | | | | | | | | | | |
| Viscosity (cps) | 4500 | 3840 | 4525 | 3750 | 4200 | 4500 | 3825 | 3900 | 4837 | 4923 | 4250 | 3880 |
| Filtration (% through) | | | | | | | | | | | | |
| 150 mesh | 100 | 100 | 100 | 100 | 100 | 100 | 100 | 100 | 100 | 100 | 100 | 100 |
| 700 mesh | 100 | 73 | 96 | 93 | 46 | 100 | 100 | 77 | 100 | 79 | 30 | 14.7 |

TABLE IV

| | Ex. 35 | Ex. 36 | Ex. 37 | Ex. 38 | Ex. 39 | Ex. I | Ex. J |
|---|---|---|---|---|---|---|---|
| POLYMER POLYOL Polymer Polyol from | Ex. 27 | Ex. 29 | Ex. 30 | Ex. 31 | Ex. 32 | Ex. G | Ex. H |
| FOAM FORMULATIONS (parts per hundred parts polyol) | | | | | | | |
| Polyol A | 60 | 60 | 60 | 60 | 60 | 60 | 60 |
| Polymer polyol | 40 | 40 | 40 | 40 | 40 | 40 | 40 |
| Water | 4.5 | 4.5 | 4.5 | 4.5 | 4.5 | 4.5 | 4.5 |
| Diethanol Amine | 1.5 | 1.5 | 1.5 | 1.5 | 1.5 | 1.5 | 1.5 |
| Catalyst A | 0.3 | 0.3 | 0.3 | 0.3 | 0.3 | 0.3 | 0.3 |
| Catalyst B | 0.23 | 0.23 | 0.23 | 0.23 | 0.23 | 0.23 | 0.23 |
| Catalyst C | 0.25 | 0.25 | 0.25 | 0.25 | 0.25 | 0.25 | 0.25 |
| Catalyst D | 0.01 | 0.01 | 0.01 | 0.01 | 0.01 | 0.01 | 0.01 |
| Surfactant A | 1.7 | 1.7 | 1.7 | 1.7 | 1.7 | 1.7 | 1.7 |
| FOAM DATA | | | | | | | |
| Processing | | | | | | | |
| Force to Crush #1 | 278 | 297 | 330 | 300 | 310 | 305 | 230 |
| Force to Crush #2 | 90 | 101 | 132 | 111 | 119 | 106 | 81 |
| Force to Crush #3 | 53 | 60 | 80 | 69 | 69 | 59 | 49 |

TABLE IV-continued

| | Example Number | | | | | | |
|---|---|---|---|---|---|---|---|
| | Ex. 35 | Ex. 36 | Ex. 37 | Ex. 38 | Ex. 39 | Ex. I | Ex. J |
| | POLYMER POLYOL | | | | | | |
| | Polymer Polyol from | | | | | | |
| | Ex. 27 | Ex. 29 | Ex. 30 | Ex. 31 | Ex. 32 | Ex. G | Ex. H |
| Vent Collapse (in) | 5.8 | 4.2 | 2.2 | 2.7 | 6.1 | 7.2 | 8.3 |

TABLE V

| | Example Number | | | | | | |
|---|---|---|---|---|---|---|---|
| | Ex. 40 | Ex. 41 | Ex. 42 | Ex. 43 | Ex. 44 | Ex. 45 | Ex. 46 |
| | POLYMER POLYOL | | | | | | |
| | Polymer Polyol from | | | | | | |
| | Ex. 27 | Ex. 29 | Ex. 30 | Ex. 31 | Ex. 32 | Ex. G | Ex. H |
| FOAM FORMULATIONS (parts per hundred parts polyol) | | | | | | | |
| Polyol A | 60 | 60 | 60 | 60 | 60 | 60 | 60 |
| Polymer polyol | 40 | 40 | 40 | 40 | 40 | 40 | 40 |
| Water | 4.5 | 4.5 | 4.5 | 4.5 | 4.5 | 4.5 | 4.5 |
| Diethanol Amine | 1.5 | 1.5 | 1.5 | 1.5 | 1.5 | 1.5 | 1.5 |
| Catalyst A | 0.3 | 0.3 | 0.3 | 0.3 | 0.3 | 0.3 | 0.3 |
| Catalyst B | 0.23 | 0.23 | 0.23 | 0.23 | 0.23 | 0.23 | 0.23 |
| Catalyst C | 0.25 | 0.25 | 0.25 | 0.25 | 0.25 | 0.25 | 0.25 |
| Catalyst D | 0.01 | 0.01 | 0.01 | 0.01 | 0.01 | 0.01 | 0.01 |
| Surfactant A | 2.5 | 2.5 | 2.5 | 2.5 | 2.5 | 2.5 | 2.5 |
| FOAM DATA | | | | | | | |
| Properties | | | | | | | |
| Density | 1.83 | 1.79 | 1.8 | 1.79 | 1.8 | 1.8 | 1.79 |
| Resiliency | 63 | 65 | 63 | 62 | 66 | 64 | 63 |
| Porosity | 4.78 | 5.58 | 6.78 | 5.78 | 3.18 | 4.78 | 1.78 |
| IFD, | | | | | | | |
| 25% | 26.3 | 26.5 | 25.8 | 25.8 | 27 | 26.3 | 26.5 |
| 65% | 73 | 75.3 | 74.5 | 76.3 | 78.3 | 73.8 | 74 |
| 65/25 | 2.78 | 2.84 | 2.89 | 2.96 | 2.9 | 2.81 | 2.79 |
| CFD, 50% | 0.4 | 0.4 | 0.38 | | 0.43 | 0.38 | 0.38 |
| Tensile | 26.1 | 24.6 | 22.9 | 22.3 | 23.8 | 20.9 | 20.3 |
| Elongation | 120.3 | 118.8 | 108.7 | 107.3 | 111.6 | 108.8 | 105.8 |
| Tear | 1.61 | 1.56 | 1.45 | 1.46 | 1.59 | 1.58 | 1.49 |
| Comp. set, 75% | 17.3 | 17.5 | 16.3 | 16.4 | 17 | 12.9 | 13.6 |
| HA load loss, 50% | −5 | −7.5 | −7.9 | | 2.3 | −2.6 | −13.2 |
| HA comp. set, 50% | 52.7 | 50.3 | 49.7 | 53.2 | 54.3 | 50.6 | 52.5 |

TABLE VI

| Polymer/Polyol Example Number | Ex. 50 | Ex. 51 | Ex. 52 | Ex. 53 | Ex. 54 | Ex. 55 |
|---|---|---|---|---|---|---|
| Base Polyol Type | Polyol K | Polyol K | Polyol K | Polyol K | Polyol K | Polyol K |
| Stabilizer Type | Ex. 2 | Ex. 16 | Ex. 47 | Ex. 9 | Ex. 48 | Ex. 16-1 |
| Stabilizer Visc. @ 25° C. (cSt) | 4262 | 2019 | 4776 | 6718 | 6888 | 2504 |
| Stabilizer Fumarate/ Maleate Unsat. Ratio | 68/32 | 100/0 | 100/0 | 100/0 | 100/0 | — |
| Stabilizer/Polyol Ratio | 18/82 | 18/82 | 8/92 | 6/94 | 8/92 | 14/86 |
| FEEDS (weight percent) | | | | | | |
| Base Polyol | 47.0 | 47.2 | 52.9 | 54.1 | 52.9 | 49.6 |
| Stabilizer | 10.3 | 10.3 | 4.6 | 3.5 | 4.6 | 8.1 |
| FLEXOL plastizer EPO | 2.0 | 2.0 | 2.0 | 2.0 | 2.0 | 2.0 |
| AIBN Catalyst | 0.5 | 0.5 | 0.5 | 0.5 | 0.5 | 0.5 |
| Acrylonitrile | 5.3 | 5.2 | 5.2 | 5.2 | 5.2 | 5.2 |
| Styrene | 26.2 | 26.1 | 26.1 | 26.1 | 26.1 | 26.0 |
| Vinylidene Chloride | 8.7 | 8.7 | 8.7 | 8.6 | 8.7 | 8.6 |
| Properties | | | | | | |
| Viscosity @ 25° C. (cPs) | 7860 | 7900 | 4649 | 4419 | 5260 | 5490 |
| Filtration (% through) | | | | | | |
| 150 mesh | 100 | 100 | 100 | 100 | 100 | 100 |
| 700 mesh | 98 | 46 | 100 | 100 | 100 | 100 |
| Polymer/Polyol Example Number | Ex. 56 | Ex. 57 | Ex. K | Ex. L | Ex. M | Ex. N |
| Base Polyol Type | Polyol K | Polyol K | Polyol K | Polyol K | Polyol K | Polyol K |
| Stabilizer Type | Ex. 16-1 | Ex. 16 | Ex. C | Ex. D | Ex. C | Ex. D |
| Stabilizer Visc. @ 25° C. (cSt) | 2504 | 2019 | 4063 | 2503 | 4063 | 2640 |
| Stabilizer Fumarate/ Maleate Unsat. Ratio | — | 100/0 | 100/0 | 100/0 | 100/0 | 100/0 |
| Stabilizer/Polyol Ratio | 10/90 | 20/80 | 14/86 | 24/76 | 14/86 | 24/76 |
| FEEDS (weight percent) | | | | | | |

TABLE VI-continued

| | | | | | | |
|---|---|---|---|---|---|---|
| Base Polyol | 51.7 | 46.0 | 49.4 | 43.7 | 49.5 | 43.9 |
| Stabilizer | 5.8 | 11.5 | 8.1 | 13.8 | 8.1 | 13.8 |
| FLEXOL plastizer EPO | 2.0 | 2.0 | 2.0 | 2.0 | 2.0 | 2.0 |
| AIBN Catalyst | 0.5 | 0.5 | 0.5 | 0.5 | 0.5 | 0.5 |
| Acrylonitrile | 5.2 | 6.0 | 6.0 | 6.0 | 5.2 | 5.2 |
| Styrene | 26.1 | 25.6 | 25.6 | 25.6 | 26.1 | 26.0 |
| Vinylidene Chloride | 8.7 | 8.4 | 8.4 | 8.4 | 8.6 | 8.6 |
| Properties | | | | | | |
| Viscosity @ 25° C. (cPs) | 5278 | 8650 | 12600 | 8820 | 15480 | 8630 |
| Filtration (% through) | | | | | | |
| 150 mesh | 100 | 100 | 100 | 100 | 100 | 100 |
| 700 mesh | 75 | 100 | 100 | 100 | 95 | 47 |

EXAMPLE 47

The stabilizer of Example 16-1 (5107 g) was reacted with Isocyanate A (20.4 g) at 80° C. for one hour to give a stabilizer with final viscosity of 4776 cSt.

EXAMPLE 48

The stabilizer of Example 16-1 (5113 grams) was reacted with Isocyanate A (33.7 g) at 80° C. for two hours to give a stabilizer with a final viscosity of 6888 cSt.

EXAMPLE 49

Polyol C (1000 g) was reacted with Isocyanate A (14 g) at 80° C. for 20 hours to give a final polyol viscosity of 5575 cSt. There was no maleate/fumarate unsaturation added to this polyol.

EXAMPLE 50-57 AND COMPARATIVE EXAMPLES K TO N

The polymer/polyols of these examples were prepared using a continuous two stage reaction system: the first a backmixed reactor with a 20 minute residence time and the second a plug flow reactor with a 20 to 23 minute residence time. The reactor was maintained at about 115° C. and about 45 psig pressure durinq the startup, lineout, and product collection periods. Unreacted monomers were stripped batchwise from the collected product. The feeds for each of the Examples 50 through 57 are given in Table VI.

Example 50 shows the improvement in polymer/-polyol viscosity (lower) with similar polymer stability (700 mesh filtration) when compared to Example M where a precursor stabilizer was used which had similar viscosity but a starter functionality of 3 and retained unsaturation of 48 percent.

Example 51 shows the improvement in polymer/-polyol viscosity with similar polymer stability when compared to Example N where a precursor stabilizer was used which had slightly higher viscosity, but did not contain ethylene oxide capping of either the starting polyol or the adduct after unsaturation addition.

Example 52 compared to Example 50 shows that additional improvement in polymer/polyol viscosity and polymer stability can be obtained when the precursor stabilizer described in this invention is used that has a higher ratio of fumarate to maleate unsaturation.

Examples 53 and 54 compared to Examples 55 and 56 show that additional improvement in polymer/polyol viscosity can be obtained with no loss in polymer stability when a lesser amount of a precursor stabilizer described in this invention is used that has a higher viscosity which is obtained by either Isocyanate A coupling (Example 54) or extended cookout time (Example 53).

EXAMPLE 58 AND COMPARATIVE EXAMPLES O and P

Examples 58 and Comparative Examples O and P consist of molded foams prepared from example polymer/polyols using the formulations in Table VII.

Example 58 shows the improvement in foam stability (reduction in vent collapse) when compared to comparative Example O where a stabilizer was used to take the polymer/polyol that had a starter functionality of 3 and retained unsaturation of 48 percent.

Example 58 likewise shows the improvement in foam stability when compared to Comparative Example O where a stabilizer was used to make the polymer/polyol which did not have ethylene oxide capping of either the starting polyol or the adduct after unsaturation addition.

TABLE VII

| | Foam Example No. | | |
|---|---|---|---|
| | 58 | O | P |
| | Polymer/Polyol From | | |
| | Ex. 57 | Ex. K | Ex. L |
| Foam Formulation (parts per hundred parts polyol) | | | |
| Polyol K | 68.80 | 68.70 | 68.90 |
| Polymer/Polyol | 31.20 | 31.30 | 31.10 |
| Water | 4.15 | 4.15 | 4.15 |
| Diethanolamine | 1.50 | 1.50 | 1.50 |
| Catalyst E | 0.13 | 0.13 | 0.13 |
| Catalyst F | 0.40 | 0.40 | 0.40 |
| Catalyst D | 0.007 | 0.007 | 0.007 |
| Surfactant A | 1.40 | 1.40 | 1.40 |
| TDI (105 Index) | 53.57 | 53.57 | 53.57 |
| Processing Vent Collapse (in) | 0.80 | 1.20 | 1.85 |

EXAMPLES 59, 60, Q and R

The improved dispersion stability of Examples 59 and 60 over Examples Q and R is shown by the attached data in Table VIII. Note that when the stabilizer level was reduced from 8 to 5 percent in Examples Q and R the product stability dropped (only 63% of the product passed the 700 mesh filtration test) and the product viscosity increased from 12,40 to 14,253 cSt. Both of these changes show that 5% of the comparative stabilizer Example C is not adequate to stabilize this product In sharp contrast, when the concentration of the stabilizer of this invention was reduced from 8 to 5 percent in Examples 59 and 60, the product dispersion stability did not decrease (still 100% through 700 mesh screen test) and the product viscosity dropped as is expected with a stable product from 10,230 to 8,623 cSt. These results show that the present invention provides an effective stabilizer at the 5% use level. In addition, the lower particle size of Example 59 versus Example Q and Example 60 versus Example R also show the greater effectiveness of the stabilizer prepared by the present invention.

TABLE VIII

| | Polymer/Polyol Example No. | | | |
|---|---|---|---|---|
| | Q | R | 59 | 60 |
| Base Polyol Type | Polyol K | Polyol K | Polyol K | Polyol K |
| Stabilizer Type | Ex. C | Ex. C | Ex. 9 | Ex. 9 |
| Stabilizer Visc. @ 25° C., cSt | 4063 | 4063 | 6718 | 6718 |
| No. of Reaction Stages | 1 | 1 | 2 | 2 |
| Stabilizer/Polyol Ratio | 8/92 | 5/95 | 8/92 | 5/95 |
| Reaction Temp., 1st Stage/2nd Stage, °C. | 125 | 126 | 125/115 | 125/124 |
| Feeds (Weight Percent) | | | | |
| Base Polyol | 45.5 | 47.1 | 46.7 | 48.3 |
| Stabilizer | 4.0 | 2.5 | 4.1 | 2.5 |
| Isopropanol | 4.0 | 4.0 | 5.0 | 5.0 |
| AIBN Catalyst | 0.8 | 0.8 | 0.8 | 0.8 |
| Acrylonitrile | 20.6 | 20.5 | 19.5 | 19.5 |
| Styrene | 25.1 | 25.1 | 23.9 | 23.9 |
| Properties | | | | |
| Viscosity at 25° C., cSt | 12,740 | 14,253 | 10,230 | 8,623 |
| Average Particle Size (microns) | 1.17 | 1.38 | 1.12 | 1.23 |
| Filtration (% through) | | | | |
| 150 mesh | 100 | 100 | 100 | 100 |
| 700 mesh | 100 | 63 | 100 | 100 |

*average particle size from Microtra Particle Size Analyzer.

EXAMPLES 61 and S

The improvement of Example 61 over Example S is shown on the attached Table IX. Example S used 10% of the stabilizer of Example D in the polyol-stabilizer portion of the feed mix which resulted in a product that had a filterability through the 700 mesh filtration test of only 94.6% and a viscosity of 4766 cSt. In contrast, only 3% of the stabilizer of Example 9 was used in Example 61 and resulted in a product having a 700 mesh filterability of 100% and a viscosity of 4197 cSt. These examples show that the stabilizer of the present invention can be used at 30% of the amount used in Example S and still make a product with better stability and lower viscosity.

TABLE IX

| | Polymer/Polyol Example No. | |
|---|---|---|
| | 61 | S |
| Base Polyol Type | Polyol D | Polyol D |
| Stabilizer Type | Ex. 9 | Ex. D |
| Stabilizer Visc. @ 25° C., cSt | 6718 | 3100 |
| No. of Reaction Stages | 1 | 1 |
| Stabilizer/Polyol Ratio | 3/97 | 10/90 |
| Reaction Temp., °C. | 115 | 120 |
| Feeds (Weight Percent) | | |
| Base Polyol | 47.1 | 44.3 |
| Stabilizer | 1.5 | 4.9 |
| Isopropanol | 2.0 | 2.0 |
| Methanol | 3.0 | 3.0 |
| AIBN Catalyst | 0.5 | 0.6 |
| Acrylonitrile | 13.7 | 13.5 |
| Styrene | 32.1 | 31.5 |
| Properties | | |
| Viscosity at 25° C., cSt | 4,197 | 4,766 |
| Filtration (% through) | | |
| 150 mesh | 100 | 100 |

TABLE IX-continued

| | Polymer/Polyol Example No. | |
|---|---|---|
| | 61 | S |
| 700 mesh | 100 | 94.6 |

COMPARATIVE EXAMPLE T

Example 51 of the U.S. Pat. No. 4,550,194 was repeated. The reaction conditions and product properties of the stabilizer prepared are shown in Table X. Since only ranges of reaction temperature and time were given in the patent, the run was made at conditions deemed most likely to give a high viscosity product. A calculation error resulted in the use of a larger ratio of ethylene oxide to malaic anhydride, but this difference is not expected to have an adverse effect on stabilizer effectiveness.

COMPARATIVE EXAMPLE U

The stabilizer from Example T was used to make a polymer/polyol of this example which is similar to Example 53 of this invention. The stabilizer/polyol ratio (6/94) and base polyol type, are the same for both runs. The reaction conditions for this preparation and the product properties are shown in Table XI. The lower polymer stability is shown by the much lower 150-mesh and 700-mesh filtrations (18 and 1 percent, respectively) of the comparative Example U when compared to Example 53 (10percent for both screens). This data indicates that the product made according to the teaching of Example 51 of U.S. Pat. No. 4,550,194 is much less effective as a stabilizer than stabilizers made by the present invention. The lower viscosity of Comparative Example U is partly due to its lower total polymer content (32.8 vs. 34.9 percent) which was consequence of lower monomer conversions.

TABLE X

| | Example No. T |
|---|---|
| Reactants | |
| Base Polyol | |
| Starter | Pentaerythritol |
| Oxides | PO/EO |
| EO Cap, % by wt. | 15 |
| Hydroxyl No. mg KOH/gm | 28 |
| Maleic Anhydride, equivalents per mole of polyol | 0.8 |
| Maleic Anhydride, % by weight | 1.00 |
| Maleic Anhydride, meq/gm | 0.100 |
| Ethylene Oxide, moles per mole maleic anhydride | 12.0* |
| Calcium Naphthanate, ppm | 200 |
| Reaction Conditions | |
| Reaction Temperature, °C. | 150 |
| Reaction Time, hrs | 10 |
| Isomerized with Morpholine | No |
| Product Properties | |
| Acid Number, mg KOH/gm | 1.13 |
| Unsaturation, mole/mole of polyol | None Measurable |
| Viscosity at 25° C., cSt | 3248 |

*This is larger than the intended 10.9 moles per mole because of a calculation error.

TABLE XI

| | Example No. | |
|---|---|---|
| | U | 53 |
| Base Polyol Type | Polyol K | Polyol K |
| Stabilizer Type | Ex. 51 USP 4,550,194 | Ex. 9 |
| Stabilizer Viscosity @ 25° C., cSt | 3248 | 6718 |
| Stabilizer Fumerate/Maleate Unsaturated Ratio | None Measurable | 100/0 |
| Stabilizer/Polyol Ratio Feeds (Weight Percent) | 6/94 | 6/94 |
| Base Polyol | 54.1 | 54.1 |
| Stabilizer | 3.4 | 3.5 |
| FLEXOL plasticizer EPO | 2.0 | 2.0 |
| AIBN Catalyst | 0.5 | 0.5 |
| Acrylonitrile | 5.2 | 5.2 |
| Styrene | 26.1 | 26.1 |
| Vinylidene Chloride | 8.7 | 8.6 |
| Properties | | |
| Viscosity @ 25° C. cPS | 3429 | 4419 |
| Filtration (% through) | | |
| 150 mesh | 18[1] | 100 |
| 700 mesh | 1[1] | 100 |

[1] Average of two analyses.

We claim:

1. A process for preparing a stable polymer/polyol comprising polymerizing one or more ethylenically unsaturated monomers in a first polyol in the presence of a free radical catalyst to obtain a polymer/polyol having a solids content greater than 25 percent by weight, based on the total weight of the polymer/polyol wherein the improvement comprises the addition of 1 to 30 weight percent, based on the total weight of the polyol, of the stabilizer prepared by:
   (1) reacting
      (a) a second polyol, said second polyol having a theoretical functionality greater than four; and
      (b) a reactive unsaturated compound capable of forming an adduct with the polyol; in the presence of a strong base at a reaction temperature wherein at least 60% of the unsaturation of the reactive unsaturated compound is retained with the proviso that if the second polyol is not capped with ethylene oxide and the adduct formed from (a) or (b) is not capped with ethylene oxide, then the second polyol and the reactive unsaturated compound are reacted with ethylene oxide and,
   (2) thereafter either (a) further reacting the product of step (1), or (b) coupling the product of step (1) with a chemically reactive compound, to obtain a final stabilizer having a viscosity greater than 2000 cSt.

2. The process of claim 1 wherein both polyols are polyoxyalkylene polyols.

3. The process of claim 1 wherein the ethlenically unsaturated monomers is one or more of styrene, acrylonitrile and vinylidene chloride.

4. The process of claim 1 wherein the reactive unsaturated compound is an anhydride.

5. The process of claim 2 wherein the anhydride is maleic anhydride.

6. The process of claim 4 wherein the adduct formed between the anhydride and the second polyol has an acid number below 3.0.

7. The process of claim 6 wherein the acid number is below 1.0.

8. The process of claim 2 wherein the strong base is potassium hydroxide.

9. The process of claim 1 wherein the polyol is started with sorbitol.

10. The process of claim 1 wherein the unsaturation is ultimately of the fumarate type.

11. The process of claim 1 wherein the chemically reactive compound is an organic polyisocyanate.

12. The process of claim 11 wherein the organic polyisocyanate is MDI.

13. The polymer/polyol prepared in accordance with claim 1.

14. The polymer/polyol prepared in accordance with claim 2.

15. The polymer/polyol prepared in accordance with claim 3.

16. The polymer/polyol prepared in accordance with claim 4.

17. The polymer/polyol prepared in accordance with claim 5.

18. The polymer/polyol prepared in accordance with claim 6.

19. The polymer/polyol prepared in accordance with claim 7.

20. The polymer/polyol prepared in accordance with claim 8.

21. The polymer/polyol prepared in accordance with claim 9.

22. The polymer/polyol prepared in accordance with claim 10.

23. The polymer/polyol prepared in accordance with claim 11.

24. The polymer/polyol prepared in accordance with claim 12.

25. A polyurethane prepared from the polymer/polyol of claim 13.

26. The polyurethane of claim 25 wherein the polyurethane is a foam.

* * * * *